(12) United States Patent
Prabhakar et al.

(10) Patent No.: US 12,066,536 B2
(45) Date of Patent: *Aug. 20, 2024

(54) LiDAR SYSTEM WITH OPTICAL CIRCULATOR

(71) Applicant: AEVA, INC., Mountain View, CA (US)

(72) Inventors: Gautam Prabhakar, Los Altos, CA (US); Behsan Behzadi, Sunnyvale, CA (US); Oguzhan Avci, Cupertino, CA (US); Keith Gagne, Santa Clara, CA (US); Kevin Pollock, Santa Clara, CA (US); Pierre Hicks, San Francisco, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 17/325,039

(22) Filed: May 19, 2021

(65) Prior Publication Data

US 2022/0163669 A1 May 26, 2022

Related U.S. Application Data

(63) Continuation of application No. 17/188,765, filed on Mar. 1, 2021, now Pat. No. 11,047,983, which is a continuation of application No. 17/105,076, filed on Nov. 25, 2020, now Pat. No. 10,948,598.

(51) Int. Cl.
*G01S 17/00* (2020.01)
*G01S 7/481* (2006.01)
*G01S 7/4912* (2020.01)
*G01S 17/34* (2020.01)
*G01S 17/58* (2006.01)
*G01S 17/89* (2020.01)

(52) U.S. Cl.
CPC .......... *G01S 17/58* (2013.01); *G01S 7/4817* (2013.01); *G01S 7/4917* (2013.01); *G01S 17/34* (2020.01); *G01S 7/4818* (2013.01); *G01S 17/89* (2013.01)

(58) Field of Classification Search
USPC ...................................................... 356/28.5
See application file for complete search history.

(56) References Cited

U.S. PATENT DOCUMENTS

| | | | |
|---|---|---|---|
| 10,267,918 | B2 | 4/2019 | LaChapelle et al. |
| 10,401,480 | B1 | 9/2019 | Gaalema |
| 10,884,130 | B1 | 1/2021 | Viswanatha |
| 10,948,598 | B1 | 3/2021 | Prabhakar et al. |
| 11,047,983 | B1 * | 6/2021 | Prabhakar ............... G01S 17/34 |
| 2013/0258312 | A1 | 10/2013 | Lewis |
| 2014/0175267 | A1 | 6/2014 | Thiel et al. |
| 2018/0074198 | A1 | 3/2018 | Von Novak et al. |
| 2018/0224547 | A1 | 8/2018 | Crouch |
| 2018/0306926 | A1 | 10/2018 | LaChapelle et al. |
| 2019/0011558 | A1 | 1/2019 | Crouch et al. |

(Continued)

*Primary Examiner* — James R Hulka
(74) *Attorney, Agent, or Firm* — Womble Bond Dickinson (US) LLP (57) ABSTRACT

A light detection and ranging (LiDAR) system according to the present disclosure comprises an optical circulator and one or more photodetectors (PDs). The optical circulator is to transmit the target return signal to the one or more PDs, where the one or more PDs are to mix the target return signal with a local oscillator (LO) signal to generate a signal to extract information of the target.

20 Claims, 9 Drawing Sheets

(56) References Cited

U.S. PATENT DOCUMENTS

| | | |
|---|---|---|
| 2019/0094352 A1 | 3/2019 | Altenmueller et al. |
| 2019/0310372 A1 | 10/2019 | Crouch et al. |
| 2019/0339388 A1 | 11/2019 | Crouch et al. |
| 2019/0361122 A1 | 11/2019 | Crouch et al. |
| 2020/0081106 A1 | 3/2020 | Kocaoglu et al. |
| 2020/0124711 A1 | 4/2020 | Rezk et al. |
| 2020/0271784 A1 | 8/2020 | Bradford et al. |
| 2020/0284883 A1 | 9/2020 | Ferreira et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0319314 A1 | 10/2020 | Behzadi et al. |
| 2020/0400798 A1 | 12/2020 | Rezk et al. |

* cited by examiner

LiDAR SYSTEM WITH OPTICAL CIRCULATOR

RELATED APPLICATIONS

This application is a continuation of U.S. patent application Ser. No. 17/188,765 filed on Mar. 1, 2021, which is a continuation of U.S. patent application Ser. No. 17/105,076 filed on Nov. 25, 2020, which issued on Mar. 16, 2021 as U.S. Pat. No. 10,948,598, the entire contents of which are incorporated herein by reference in their entirety.

TECHNICAL FIELD

The present disclosure relates generally to light detection and ranging (LiDAR) systems, and more particularly to a coherent LiDAR system utilizing polarization-diverse architecture.

BACKGROUND

Conventional LiDAR systems collect either a single polarization state or limited polarization states of light scattered or returned from a target or a target environment. However, since certain diffusive targets may scatter an incident light with one polarization state into a returned optical beam or a returned light signal with multiple arbitrary polarization states, such systems suffer from an inherent inefficiency in the amount of light collected from the target, thereby reducing the coherently mixed heterodyne signal. As such, there is a need to develop a LiDAR system with a polarization-diverse architecture that enables the collection and mixing of all or dominant polarization states scattered from the target in order to improve the efficiency of a heterodyne signal.

SUMMARY

The present disclosure describes various examples of LiDAR systems utilizing polarization-diverse architecture.

As an example, disclosed herein is a LiDAR system with an optical subsystem configured to efficiently collect all possible polarization states in a returned target signal scattered from a target and coherently mixing the returned target signal with an appropriate LO signal to obtain range and velocity profile of the target, e.g., by using FMCW LiDAR architecture. A method to collect all possible polarization states in the returned target signal scattered from the target, and to coherently mix the returned target signal with the appropriate LO signal in a LiDAR system is also disclosed. Different combinations of polarization optics, including linear polarizers, wave-retardation optics, and magneto-optics such as Faraday rotators are utilized to achieve the above discussed objectives. The technique may be utilized in both a coaxial system and a non-coaxial system, as well as in both a free-space optics based system and a waveguide (single-mode or multi-mode waveguide in fiber as well as semiconductor or dielectric photonic circuit architecture) based system.

In one example, a LiDAR system according to the present disclosure includes a combination of polarizers, wave plates and magneto-optical elements by using a polarization-diverse architecture, where all polarization states in a scattered target signal are collected and mixed with a local oscillator (LO) signal to generate a coherent heterodyne signal. The LiDAR system improves the collection and mixing efficiency of the scattered target signal with the LO signal, thereby improving a signal-to-noise ratio (SNR) of the system.

In one example, a LiDAR system according to the present disclosure comprises an optical source to emit an optical beam and an optical circulator to receive the optical beam and transmit the optical beam to a target, to receive a target return signal from the target and to transmit the target return signal to one or more photodetectors (PDs). The optical circulator is configured to collect all polarization states in the target return signal. The LiDAR system further comprises an optical element to generate a local oscillator (LO) signal. The LiDAR system further comprises the one or more PDs to mix the target return signal with the LO signal to generate a heterodyne signal to extract range and velocity information of the target.

In one example, a method in a LiDAR system according to the present disclosure comprises emitting an optical beam with an optical source, receiving, by a circulator, the optical beam; transmitting, by the circulator, the optical beam to a target; receiving, by the circulator, a target return signal returned from the target, including collecting, by the circulator, all polarization states in the target return signal; transmitting, by the circulator, the target return signal to one or more photodetectors (PDs); generating, by an optical component, a local oscillator (LO) signal; and mixing, by the one or more PDs, the target return signal with the LO signal to generate a heterodyne signal to extract range and velocity information of the target.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The present disclosure describes examples of coherent LiDAR systems, for example, frequency-modulated continuous-wave (FMCW) LiDAR systems, and example methods therein. The described LIDAR system may be implemented in any sensing market, such as, but not limited to, transportation, manufacturing, metrology, medical, and security systems. According to some embodiments, the described LiDAR system may be implemented as part of a front-end coherent LiDAR system (e.g., a FMCW LiDAR device) that assists with spatial awareness for automated driver assist systems, or self-driving vehicles.

Range and velocity profile of a target may be measured using a coherent LiDAR system, e.g., a FMCW LiDAR system, wherein backscattered light from the target may be mixed with an LO signal to generate a coherent heterodyne signal, from which range and velocity information of the target may be extracted. Maximizing a collection and mixing efficiency of a scattered target signal with the LO signal is important to increase a signal-to-noise ratio (SNR) of the system, which in turn enhances a detection sensitivity. The target may scatter an incident light into scattered light with multiple arbitrary polarization states, regardless of a polarization state of the incident light. By maximizing the collection and mixing of the scattered target signal with the LO signal in all polarization states, an improvement in the SNR of the system may be realized.

Figure 1A:
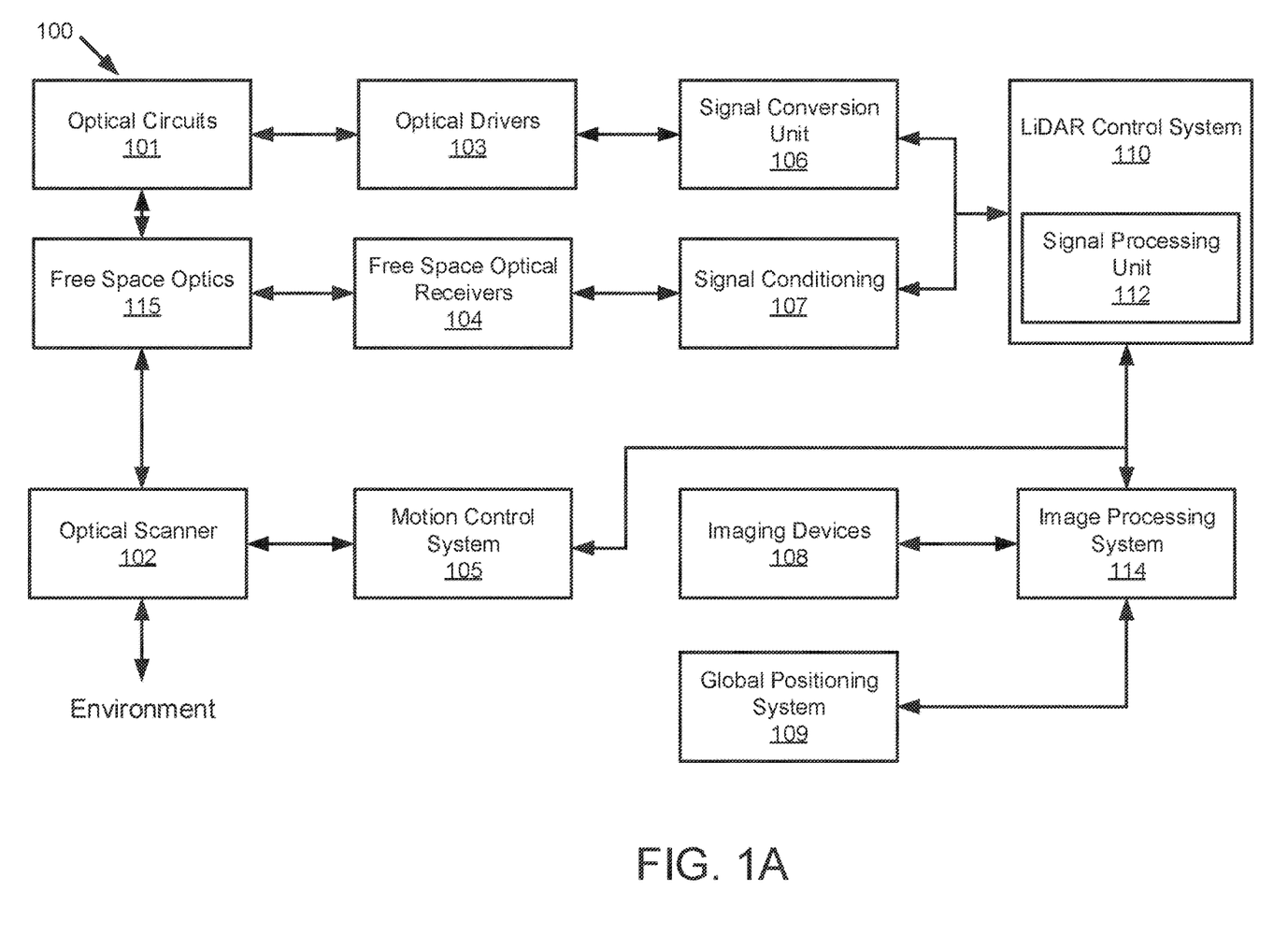
FIG. 1A is a block diagram illustrating an example LiDAR system according to embodiments of the present disclosure.

FIG. 1 illustrates a LiDAR system 100 according to example implementations of the present disclosure. The LiDAR system 100 includes one or more of each of a number of components, but may include fewer or additional components than shown in FIG. 1. As shown, the LiDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
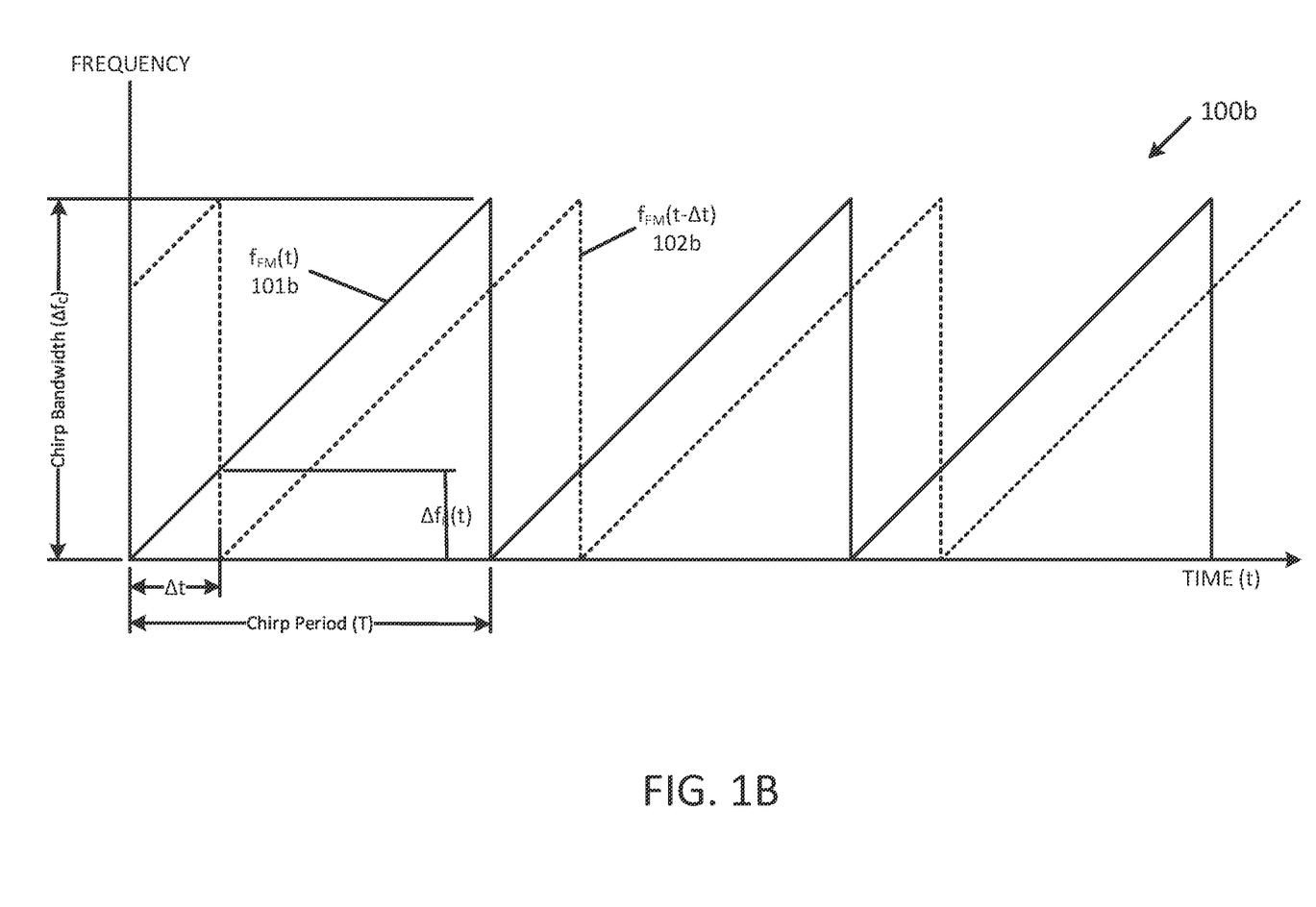
FIG. 1B is a time-frequency diagram illustrating an example of FMCW LIDAR waveforms according to embodiments of the present disclosure.

FIG. 1B is a time-frequency diagram 100b of an FMCW scanning signal 101b that can be used by a LiDAR system, such as system 100, to scan a target environment according to some embodiments. In one example, the scanning waveform 101b, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 1B also depicts target return signal 102b according to some embodiments. Target return signal 102b, labeled as $f_{FM}(t-\Delta t)$, is a time-delayed version of the scanning signal 101b, where $\Delta t$ is the round trip time to and from a target illuminated by scanning signal 101b. The round trip time is given as $\Delta t=2R/v$, where R is the target range and v is the velocity of the optical beam, which is the speed of light c. The target range, R, can therefore be calculated as $R=c(\Delta t/2)$. When the return signal 102b is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LiDAR system 100. The digitized beat frequency signal can then be digitally processed, for example, in a signal processing unit, such as signal processing unit 112 in system 100. It should be noted that the target return signal 102b will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 1B for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 2:
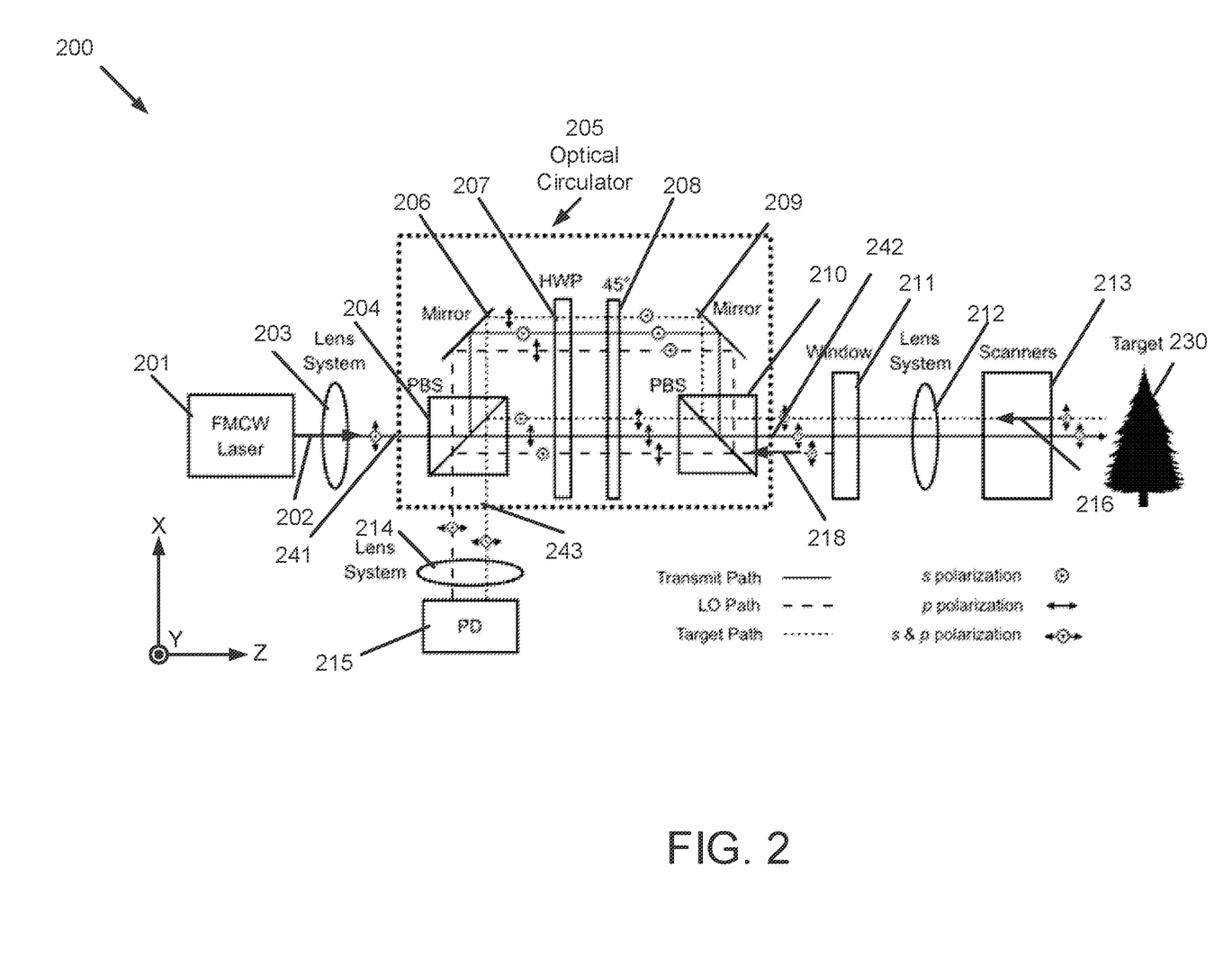
FIG. 2 is a block diagram illustrating an example of an optical subsystem of a LiDAR system according to embodiments of the present disclosure.

FIG. 2 is a block diagram illustrating an example of an optical subsystem of a LiDAR system 200 with a free-space polarization-diverse configuration according to embodiments of the present disclosure. The LiDAR system 200 includes a photonics chip which may include a coherent LIDAR, e.g., an FMCW LIDAR, photonic integrated circuit (PIC) and/or free-space optics. In one example, the optical circuits 101, described with respect to FIG. 1, may be implemented on a photonics chip. The optical subsystem may include the optical circuits 101, described with respect to FIG. 1. Disclosed herein is the LiDAR system 200 with the optical subsystem configured to efficiently collect all possible polarization states in a returned target signal scattered from a target and coherently mixing the returned target signal with an appropriate LO signal to obtain range and velocity profile of the target, e.g., by using FMCW LiDAR architecture. A method to collect all possible polarization states in the returned target signal scattered from the target, and to coherently mix the returned target signal with the appropriate LO signal in a LiDAR system is also disclosed. Different combinations of polarization optics, including linear polarizers, wave-retardation optics, and magneto-optics such as Faraday rotators are utilized to achieve the above discussed objectives. The technique may be utilized in both a coaxial system and a non-coaxial system, as well as in both a free-space optics based system and a waveguide (single-mode or multi-mode waveguide in fiber as well as semiconductor or dielectric photonic circuit architecture) based system.

As shown in the embodiment depicted in FIG. 2, the LiDAR system 200 may include an optical source 201 (e.g., a FMCW laser) which may emit an optical beam 202. The optical beam 202 may be multi-spectral (i.e., containing more than one wavelength). As depicted in FIG. 2, the optical source 201 may be optically coupled to an optical circulator 205.

The optical circulator 205 may include a first polarizing beam splitting element (PBS) 204, a second PBS 210, a half-wave plate (HWP) 207, and a non-reciprocal optical element 208. The optical circulator 205 may further include a first mirror 206 and a second mirror 209. The non-reciprocal optical element may include a non-reciprocal optical device or a magneto-optic device. According to some embodiments, a non-reciprocal optical device can be a device through which changes in the properties of light passing are not reversed when the light passes through in an opposite direction. According to one embodiment, a Faraday rotator is a non-reciprocal optical device. In such scenarios, the Faraday rotator can be used as a polarization rotator that enables the transmission of light through a material when a longitudinal static magnetic field is present. In this fashion, non-reciprocal optical devices described herein include the functionality to rotate the state of a polarization as a wave traverses a device. Using non-reciprocal optical devices, as described herein, can reflect a polarized beam back through the same non-reciprocal optical device in a manner that does not undo the polarization change the beam underwent in its forward pass through the medium and instead doubles the change in polarization state, compared to the initial state. In some scenarios, by implementing a Faraday rotator with a rotation of 45°, downstream reflections from a linearly polarized source will return with the polarization rotated by 90°, after the reverse pass through the Faraday rotator.

Referring to FIG. 2, for instance, the non-reciprocal optical element 208 may include a Faraday rotator (FR) in one embodiment. As another example, the non-reciprocal optical element 208 may include an optical element based on an opto-mechanically induced non-reciprocity in a whispering gallery mode microcavity. In one embodiment, the beam splitting elements may include a first polarizing beam splitter (PBS) and a second PBS. In some other embodiments, the polarizing beam splitting elements may include a birefringent crystal or a Wollaston prism. The birefringent crystal may be a uniaxial or a biaxial crystal. Different kinds of linear optical birefringent devices may be used to realize a half-wave plate.

The optical circulator 205 may be coupled with an optical window 211 that is configured to generate a local oscillator (LO) signal. The optical circulator 205 may have a first port 241, a second port 242 and a third port 243. The first port 241 may be coupled with the optical source 201. The second port 242 may be coupled with the optical window 211. The third port 243 may be coupled with a PD 215. One or more scanners 213 may be coupled between the optical window 211 and a target 230 to scan the target. The optical subsystem may further include one or more lens systems 203, 212, 214 to focus or expand the optical beam 202.

The optical beam 202 may be linearly polarized at a 45° angle in the x-y plane. The optical beam 202 may have both an s-polarization component and a p-polarization component that are in-phase. The optical beam 202 may be collimated by using the lens system 203.

The optical beam 202 may pass through the PBS 204, which may separate the s-polarization component and the p-polarization component of the optical beam 202 into two separate paths. For example, the first PBS 204 may be deposited with a coating such that the first PBS 204 may transmit the p-polarization component of the optical beam 202 and reflects the s-polarization component of the optical beam 202. The p-polarization component of the optical beam 202 may be transmitted through the first PBS 204 in the first path in a first direction, while the s-polarization component of the optical beam 202 may be reflected by the first PBS 204 in the second path in a second direction. The s-polarization component of the optical beam 202 may be reflected by a first mirror 206. The first mirror 206 may be placed at a +45° (or −45°) with respect to an x-direction as illustrated in FIG. 2. The first PBS 204 may transmit the p-polarization component of the optical beam 202 toward the target 230 in a target environment. The p-polarization component of the optical beam 202 is the polarization of the beam that is parallel to the plane of incidence of the optical beam 202. The first PBS 204 may reflect the s-polarization component of the optical beam 202 toward the first mirror 206. The s-polarization component of the optical beam 202 is the polarization of the beam that is perpendicular to the plane of incidence of the optical beam 202.

Both the p-polarization component of the optical beam 202 in the first path and the s-polarization component of the optical beam 202 in the second path may pass through the HWP 207 and the non-reciprocal optical element 208, e.g., Faraday rotator (FR) 208, with a 45° polarization rotation, such that both the p-polarization component and s-polarization component maintain their respective polarization.

For example, the optic axis of the HWP 207 may be arranged at 22.5° to the x-axis, so that the s-polarization component of the optical beam 202 may be rotated by +45°. The HWP 207 may introduce a polarization rotation of +45° to the s-polarization component of the optical beam 202. A thickness of the non-reciprocal optical element 208 may be selected for providing 45° polarization rotation and the rotation direction may be selected to be counterclockwise when light propagates along the z-axis in the first direction. The first direction is a direction along the z-axis as illustrated in FIG. 2. The non-reciprocal optical element 208 may introduce a polarization rotation of −45° to the s-polarization component of the optical beam 202 in the first direction. Thus, the polarization rotation of +45° of the s-polarization component of the optical beam 202 made by the HWP 207, which may be +45°, may be cancelled by the polarization rotation of −45° of the Faraday rotator. Therefore, both the p-polarization component and s-polarization component of the optical beam 202 are unchanged after passing through the HWP 207 and the non-reciprocal optical element 208 in the first direction. The HWP 207 and the non-reciprocal optical element 208 are configured to maintain a polarization of the p-polarization component and a polarization of the s-polarization component in the first direction. The s-polarization component of the optical beam 202 may be reflected by the second mirror 209 towards the second PBS 210. The second mirror 209 may be placed at a −45° (or +45°) with respect to the x-axis.

Then, the p-polarization component of the optical beam 202 in the first path and the s-polarization component of the optical beam 202 in the second path may be combined by the second PBS 210. The second PBS 210 may transmit the recombined optical beam 202 out of the optical circulator 205 from the second port. As shown in FIG. 2, for example, the first mirror 206 and the second mirror 209 may be placed perpendicular to each other. The first mirror 206 may be placed at a 45° angle clockwise with respect to the x-axis, and the second mirror 209 may be placed at a 45° angle counterclockwise (−45°) with respect to the x-axis. The s-polarization component of the optical beam 202 and the p-polarization component of the optical beam 202 may have different optical path lengths in the optical circulator 205. Advantageously, this can be used to de-correlate the shot noise between the two polarizations. For example, the s-polarization component of the optical beam 202 may have a larger optical path length than the p-polarization component of the optical beam 202 in the first direction. In other embodiments, the optical circular may have the first mirror and the second mirror placed at different locations than shown in FIG. 2, while the s-polarization component of the optical beam and the p-polarization component of the optical beam may have a same optical path length in the optical circulator.

The recombined optical beam 202 may pass through the optical window 211. The optical window 211 may be deposited with a special coating, such that optical window 211 may reflect a small first portion of the optical beam 202, thereby generating an LO signal 218. The optical window 211 may be configured to at least partially reflect the first portion of the optical beam 202 for generating the LO signal 218 and to transmit a second portion of the optical beam 202 towards the target 230. The second portion of the optical beam 202 may be transmitted through a lens system 212 and one or more scanners 213 to deliver the optical beam 202 to the target 230. The lens system 212 may be configured to expand the optical beam 202. The one or more scanners 213 may be configured to scan and illuminate the target 230 in the target environment to generate a target return signal 216.

According to some scenarios, the target return signal 216 may be scattered or reflected from the target 230. The target return signal 216 may have both an s-polarization component and a p-polarization component (with undetermined phase difference between them). The target return signal 216 may also have an arbitrary polarization. In some scenarios, the target return signal 216 may be collected by using the same components described above as in the transmission process. After passing through the window 211, the target return signal 216 may co-propagate with the LO signal 218 in a second direction opposite to the Z-axis, as illustrated in FIG. 2. Both the target return signal 216 and the LO signal 218 may be divided into the s-polarization component and the p-polarization component in a return path by using the second PBS 210. The s-polarization component of the target return signal 216 and the LO signal 218 may be reflected by the second mirror 209 toward the combination of non-reciprocal optical element 208 and the HWP 207.

Next, the combination of non-reciprocal optical element 208 and the HWP 207 may convert the s-polarization component in the target return signal 216 and/or the LO signal 218 to a p-polarization component, and convert the p-polarization component in the target return signal 216 and the LO signal 218 to an s-polarization component, due to the non-reciprocal nature of the FR 208. The HWP 207 and the non-reciprocal optical element 208 are configured to change a polarization of the p-polarization component and the s-polarization component of the target return signal 216 and the LO signal 218 by 90° in the second direction. Due to the non-reciprocal rotation of the FR 208, in the second direction, polarization rotations by both the HWP 207 and the non-reciprocal optical element 208 are in the same direction (not cancelled out), resulting in a total rotation of 90°.

Both the p-polarization component and the s-polarization component of the target return signal 216 and the LO signal 218 may pass through the first PBS 204 and focused and mixed on the PD 215. The p-polarization component of the target return signal 216 and the LO signal 218 may be reflected by the first mirror 206 towards the first PBS 204, and then be transmitted to the PD 215 by the first PBS 204. The s-polarization component of the target return signal 216 and the LO signal 218 may be reflected by the first PBS 204 towards the PD 215. A lens system 214 may be used to focus the p-polarization component and the s-polarization component of the target return signal 216 and the LO signal 218 to the PD 215.

According to some embodiments, for a multi-wavelength system, the light can be split into the respective wavelength paths via a wavelength demultiplexer (DEMUX) optics such as dichroic mirror(s) (not shown) and focused onto individual PDs for each wavelength using their respective lens system. For example, a DEMUX optics (not shown) may be coupled between the third port 243 of the circulator 205 and the lens system 214. The DEMUX optics may be used to separate different wavelengths and direct them to dedicated detectors. The DEMUX optics may be for example, and without limitation, a dichroic mirror, a Bragg grating or any other suitable wavelength demultiplexer. The separate wavelengths may then be focused by respective lens systems onto respective photodetectors.

Figure 3:
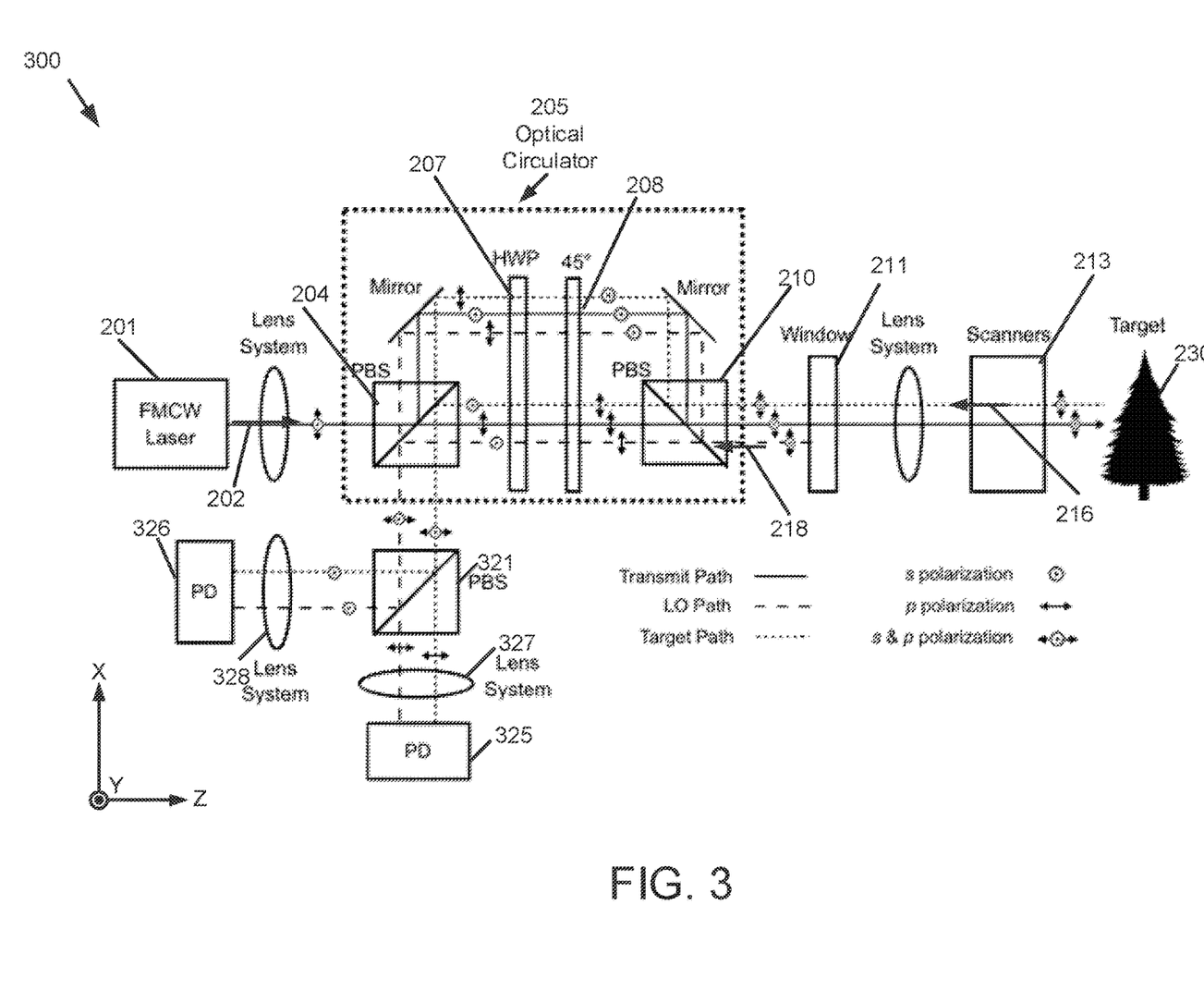
FIG. 3 is a block diagram illustrating an example of an optical subsystem of a LiDAR system according to embodiments of the present disclosure.

FIG. 3 is a block diagram illustrating an example of an optical subsystem of a LiDAR system 300 with an alternative polarization-diverse configuration according to embodiments of the present disclosure. The LiDAR system 300 is similar to the LiDAR system 200, except that a third PBS 321, two PDs 325, 326 and two corresponding lens systems 327, 328 are employed instead of the PD 215 and the corresponding lens system 214 in FIG. 2.

As shown in FIG. 3, the p-polarization component and the s-polarization component of the target return signal 216 and the LO signal 218 may be split by using the third PBS 321. The third PBS 321 may transmit the p-polarization component of the target return signal 216 and the LO signal 218 to a PD 325, and reflect the s-polarization component of the target return signal 216 and the LO signal 218 to another PD 326. The p-polarization component and the s-polarization component of the target return signal 216 may be combined with a corresponding polarization component on two separate PDs 325, 326 to generate two heterodyne signals. The lens system 327 or lens system 328 may be configured to focus the p-polarization component or the s-polarization component respectively.

As illustrated in FIG. 2 and FIG. 3, the optical circulator comprises the first PBS 204 and the second PBS 210, the HWP 207, and the non-reciprocal optical element 208. The optical circulator may be made using different methods to give the same resulting polarization states. These methods include, but are not limited to, using other non-reciprocal or magneto-optic devices instead of the FR, using different kinds of birefringent crystals (such as uniaxial and biaxial crystals, Wollaston prisms, etc.) instead of the PBS, and using different kinds of linear optical birefringent devices to realize a waveplate.

Figure 4:
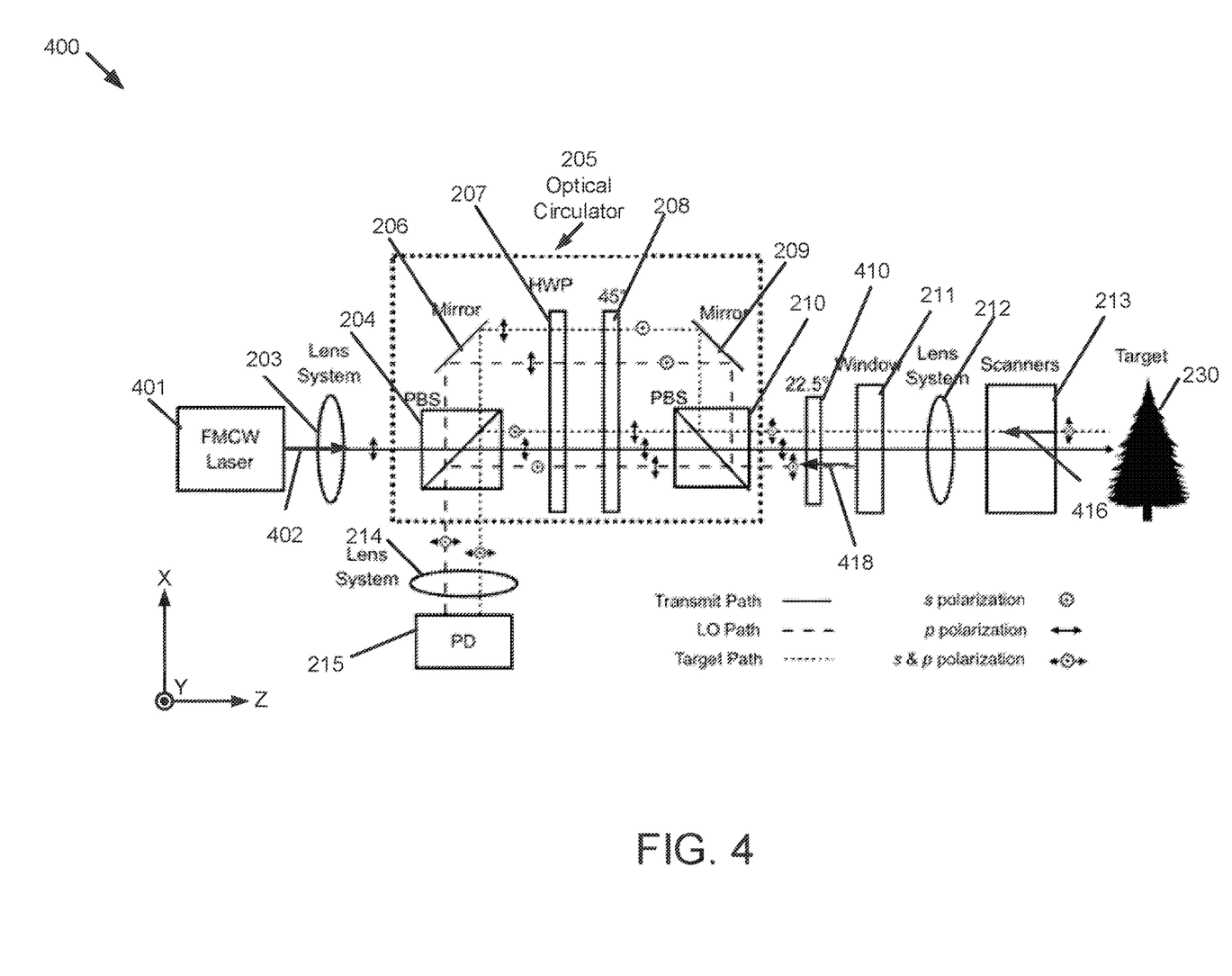
FIG. 4 is a block diagram illustrating an example of an optical subsystem of a LiDAR system according to embodiments of the present disclosure.

FIG. 4 is a block diagram illustrating an example of an optical subsystem of a LiDAR system 400 with another polarization-diverse configuration according to embodiments of the present disclosure. The LiDAR system 400 is similar to the LiDAR system 200, except that a second non-reciprocal optical element 410, e.g., a second FR 410, arranged to rotate a polarization by 22.5° in the first direction and to rotate a polarization by 22.5° in the second direction, is coupled between the optical circulator 205 and the optical window 211. The second non-reciprocal optical element 410 is to rotate a polarization of the LO signal by 45 degrees. The second non-reciprocal optical element 410 may also be placed outside the optical window 211 and coupled between the optical window 211 and the lens system 212.

As shown in FIG. 4, the optical beam 402 may be linearly polarized and aligned to only have a p-polarization component. The FMCW laser 401 may launch the p-polarization component. In this case, the optical beam 402 may be transmitted by the first PBS 204. After passing through the second PBS 210, the second non-reciprocal optical element 410 may rotate the p-polarization component of the optical beam by 22.5°, which may result in the LO signal 418 to be 45° after passing through the second non-reciprocal optical element 410 on the return path. Since the backscattered target return signal 416 from the target 230 may have both s-polarization and p-polarization components (with undetermined phase), having the LO signal 418 at 45° linear polarization may help in mixing the LO signal 418 efficiently with the target return signal 416.

Similar to described in connection with FIG. 2, both the s-polarization component and the p-polarization component of the LO signal 418 and the target return signal 416 may be combined on the PD 215, after being focused by the lens system 214. Alternatively, the s-polarization component and the p-polarization component of the LO signal and the target return signal may be split using a third PBS, and combined on two separate PDs, as shown in FIG. 3.

Figure 5:
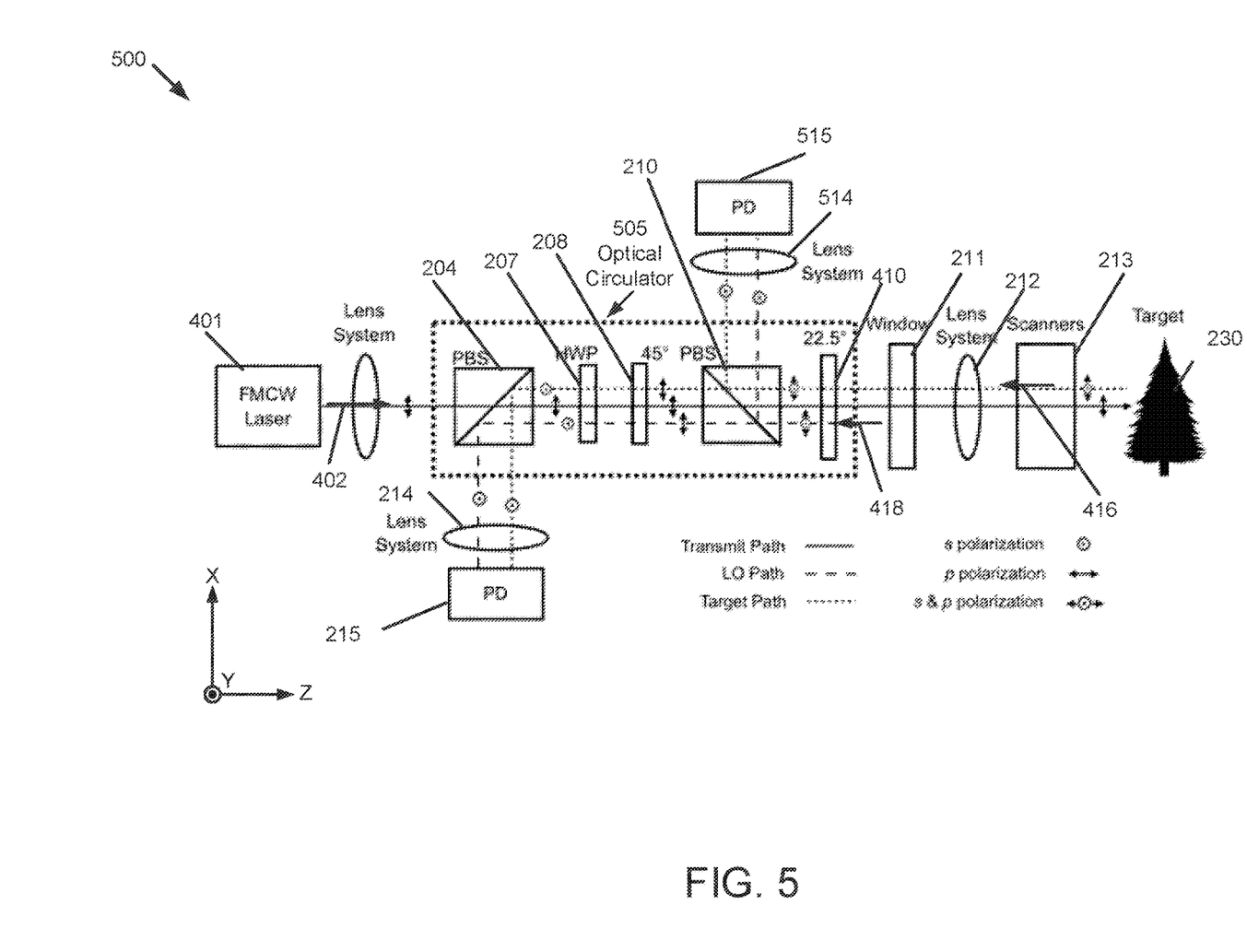
FIG. 5 is a block diagram illustrating an example of an optical subsystem of a LiDAR system according to embodiments of the present disclosure.

FIG. 5 is a block diagram illustrating an example of an optical subsystem of a LiDAR system 500 with a polarization-diverse configuration according to embodiments of the present disclosure. The LiDAR system 500 is similar to the LiDAR system 400, except that the optical circulator 505 does not include the first mirror and the second mirror, but includes the second non-reciprocal optical element 410, and the optical circulator 505 has a fourth port coupled with a second PD 515 and a corresponding lens system 514.

As shown in FIG. 5, the s-polarization component of the LO signal 418 and the target return signal 416 may be reflected by the second PBS 210 towards the lens system 514 and the second PD 515. The p-polarization component of the LO signal 418 and the target return signal 416 may be combined and mixed in the PD 215 to generate a first heterodyne signal. The s-polarization component and the p-polarization component of the LO signal 418 and the target return signal 416 may be combined and mixed in the second PD 515 to generate a second heterodyne signal.

Figure 6:
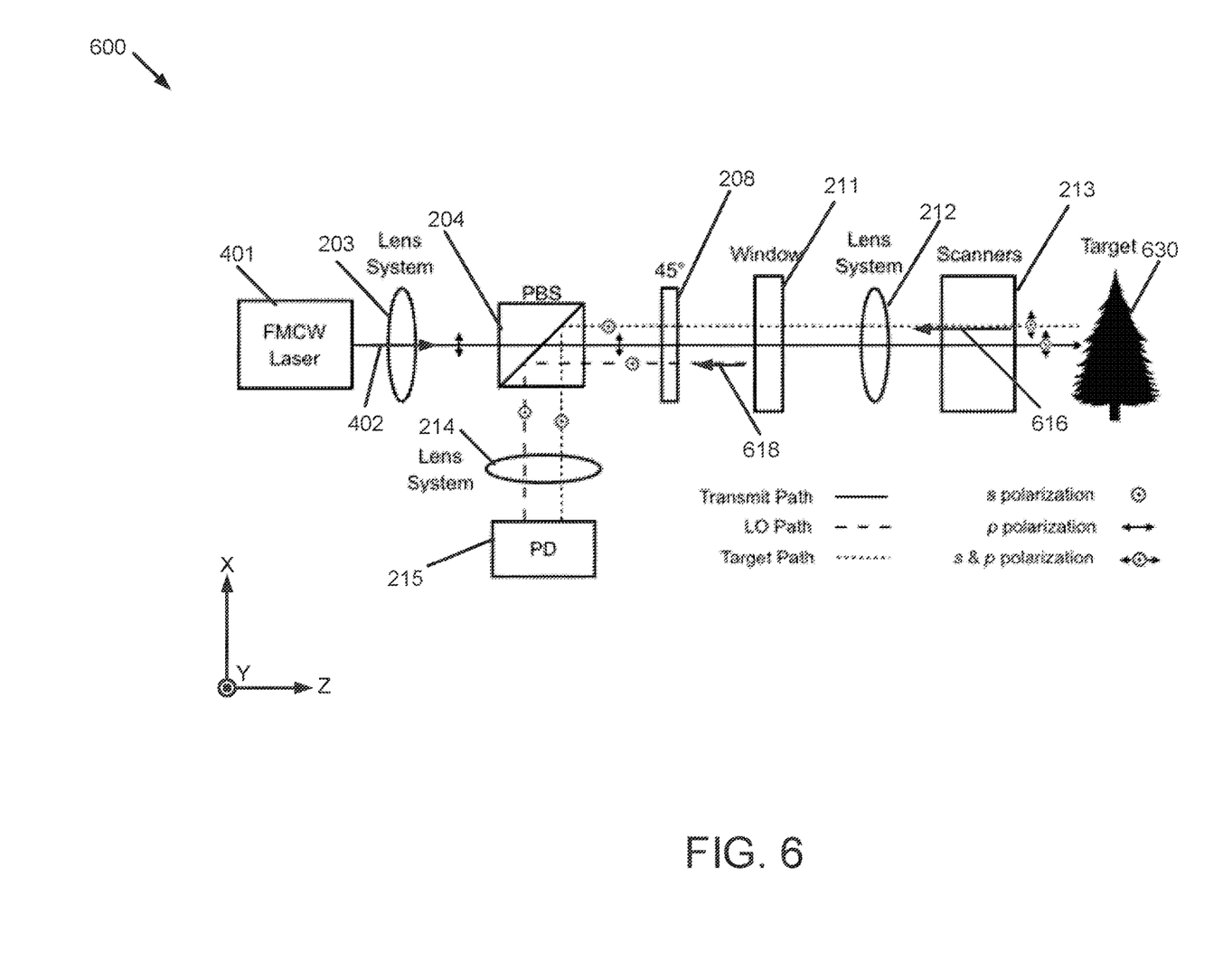
FIG. 6 is a block diagram illustrating an example of an optical subsystem of a LiDAR system according to embodiments of the present disclosure.

FIG. 6 is a block diagram illustrating an example of an optical subsystem of a LiDAR system 600 according to embodiments of the present disclosure. The FMCW laser 401 may launch the p-polarization component of the optical beam 402. A target 630 may be known to primarily scatter an incident light in the same polarization as an input linear polarization of the incident light, which may be true for most diffuse scattered objects that are of interest in an automotive LIDAR system. In this case, the PBS 240 and the non-reciprocal optical element 208 may be used to direct the optical beam 402 instead of the optical circulator 205 or the optical circulator 505.

As shown in FIG. 6, the p-polarization component of the optical beam 402 is output from the FMCW laser 401, and pass through a transmit port of the PBS 204. The non-reciprocal optical element 208 with the 45° polarization rotation is used to rotate the p-polarization component to a linear combination of an s-polarization component and a p-polarization component (in-phase). After passing through the LO-generating window 211, the beam-expanding lens system 212 and the one or more scanners 213, the linear combination of the s-polarization component and the p-polarization component impinge on the target 630. The target 630 may reflect light primarily in the same polarization as the input linear combination. A target return signal 616 may be received by the same optics as the transmitted beam. The target return signal 616 may have the same linear combination of the s-polarization component and the p-polarization component as the incident beam. The LO signal 618, generated by a window plate, has the same polarization (45°, or a combination of s-polarization and p-polarization component, in-phase). The LO signal 618 along with the co-axial target return signal 616 may be converted to an s-polarization component after passing through the non-reciprocal optical element 208 on a return path. The PBS 204 may then reflect both the LO signal 618 and the target return signal

616. Both the LO signal 618 and the target return signal 616 may be focused using the lens system 214 and mixed on the PD 215.

Figure 7:
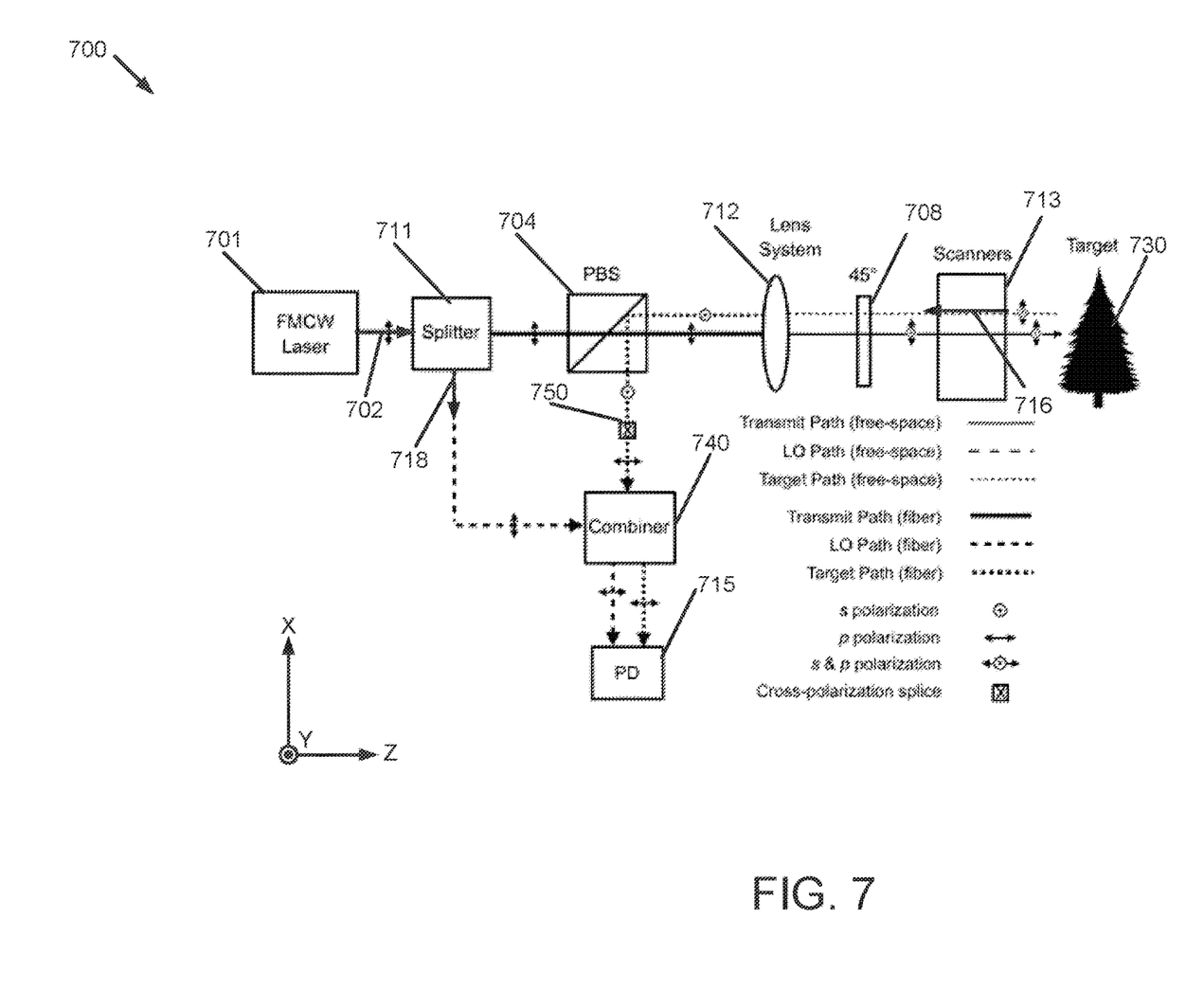
FIG. 7 is a block diagram illustrating an example of an optical subsystem of a LiDAR system according to embodiments of the present disclosure.

FIG. 7 is a block diagram illustrating an example of an optical subsystem of a LiDAR system 700 according to embodiments of the present disclosure. A fiber-based architecture (single-mode or multi-mode, including polarization-maintaining) may be used, as shown in FIG. 7. The FWCW laser may emit an optical beam 702 with a p-polarization component. An LO signal 718 may be generated using a beam splitter 711 (based on a fused fiber coupler or any other technology). A beam combiner 740 may be used to combine and mix the LO signal 718 and a target return signal 716 on the PD 715. A balanced, differential or any other suitable detection mode of the PD may be used.

Here, a fiber-version FR (not shown) may be used, or an external free-space FR 708 may also be used, before or after the lens system 712. As discussed above, the target return signal 716 may have an s-polarization component after passing the PBS 704 on a return pass. A fiber rod rotation or a cross-polarization splice (made by splicing two polarization-maintaining fibers such that the slow axis of the two fibers are orthogonally aligned) or an appropriate waveplate may be used to convert a polarization from s top or vice-versa, in either the LO or target fiber path. As shown in FIG. 7, a cross-polarization splice 750 is used to convert the s-polarization component of the target return signal 716 into a p-polarization component in the target return path.

Figure 8:
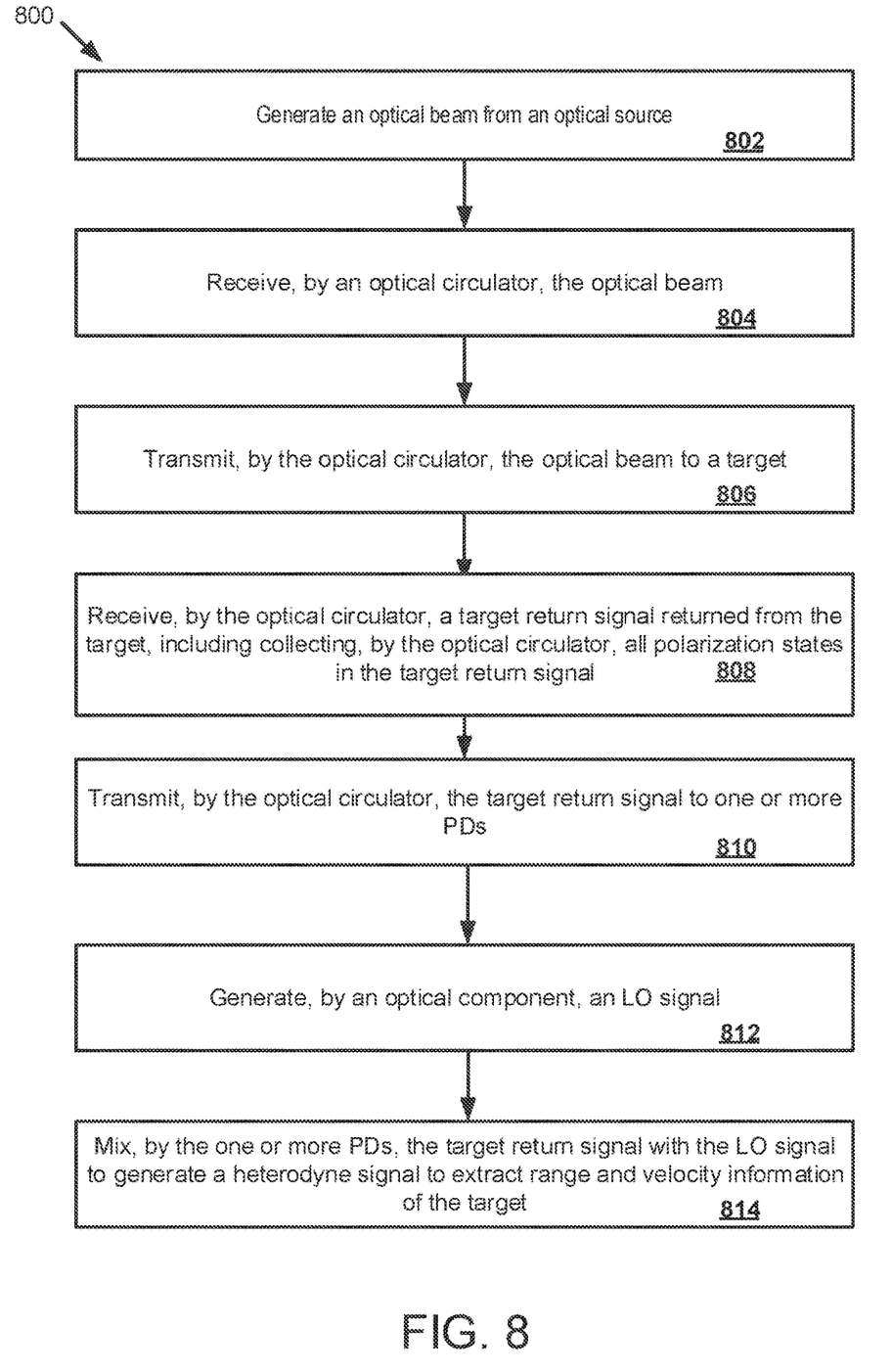
FIG. 8 is a flow diagram illustrating an example method in a LIDAR system according to embodiments of the present disclosure.

FIG. 8 is a flow diagram illustrating an example method 800 in a LiDAR system, according to embodiments of the present disclosure. Various portions of method 800 may be performed by LiDAR system 200, 300, 400, 500, 600 and 700, as illustrated in FIGS. 2, 3, 4, 5, 6 and 7 respectively and described in detail above.

With reference to FIG. 8, method 800 illustrates example functions used by various embodiments. Although specific function blocks (or operations) are disclosed in method 800, such blocks (or operations) are examples. That is, embodiments are well suited to performing various other blocks (or operations) or variations of the blocks (or operations) recited in method 800. It is appreciated that the blocks (or operations) in method 800 may be performed in an order different than presented, and that not all of the blocks (or operations) in method 800 may be performed.

At 802, an optical source of a LiDAR system generates an optical beam. The optical sources may generate multiple beams, and each beam may have multiple wavelengths. For example, the optical beam may be linearly polarized at a 45° angle in the x-y plane. For another example, the optical beam may be p-polarization or s-polarization with respect to a PBS that receives the optical beam.

At 804, the optical beam is received, by an optical circulator.

At 806, the optical circulator transmits the optical beam to a target.

At 808, the optical circulator receives a target return signal returned from the target, including the optical circulator collects all polarization states in the target return signal.

At 810, the optical circulator transmits the target return signal to one or more photodetectors (PDs).

At 812, an optical component generates an LO signal.

At 814, the one or more PDs mix the target return signal with the LO signal to generate a heterodyne signal to extract range and velocity information of the target.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LiDAR) system, comprising:
   one or more photodetectors (PDs); and
   an optical circulator to receive an optical beam and transmit the optical beam to a target, the optical circulator further to receive a target return signal from the target and to transmit the target return signal to the one or more PDs, wherein the one or more PDs to mix the target return signal with a local oscillator (LO) signal to generate a signal to extract range and velocity information of the target.

2. The LiDAR system of claim 1, wherein the optical circulator comprises a first polarizing beam splitting element and a non-reciprocal optical element.

3. The LiDAR system of claim 2, wherein the non-reciprocal optical element comprises a Faraday rotator (FR).

4. The LiDAR system of claim 2, wherein the first polarizing beam splitting element comprises a first polarizing beam splitter (PBS).

5. The LiDAR system of claim 2, wherein the optical circulator further comprises a half-wave plate and a second polarizing beam splitting element.

6. The LiDAR system of claim 1, further comprising an optical window to generate the LO signal, and wherein the optical circulator is further to receive the LO signal returned from the optical window, and to transmit the LO signal to the one or more PDs.

7. The LiDAR system of claim 6, further comprising a second non-reciprocal optical element disposed between the optical circulator and the optical window, wherein the second non-reciprocal optical element is to rotate a polarization of the LO signal by 45 degrees.

8. The LiDAR system of claim 1, wherein the optical source comprises a frequency modulated continuous-wave (FMCW) laser.

9. The LiDAR system of claim 1, further comprising a beam splitter to generate the LO signal, and wherein the one or more PDs are to receive the LO signal generated by the beam splitter directly.

10. The LiDAR system of claim 1, further comprising a cross-polarization splice, wherein the cross-polarization splice is to convert an s-polarization component of the target return signal into a p-polarization component in a target return path.

11. The LiDAR system of claim 1, further comprising a beam combiner to combine and mix the LO signal and the target return signal on the one or more PDs.

12. The LiDAR system of claim 1, wherein the signal is a heterodyne signal.

13. The LiDAR system of claim 1, wherein the information comprises range.

14. A method of light detection and ranging (LiDAR), comprising:
transmitting, by an optical circulator, a target return signal to one or more photodetectors (PDs); and
mixing, by the one or more PDs, the target return signal with a local oscillator (LO) signal to generate a signal to extract range and velocity information of the target.

15. The method of claim 14, wherein the signal is a heterodyne signal.

16. The method of claim 14, wherein the information comprises range.

17. The method of claim 14, further comprising rotating, by a non-reciprocal optical element, a polarization of the LO signal by 45 degrees.

18. The method of claim 14, further comprising:
generating the LO signal by an optical window;
receiving the LO signal, by the optical circulator, returned from the optical window; and
transmitting the LO signal, by the optical circulator, to the one or more PDs.

19. The method of claim 14, further comprising:
generating the LO signal by a beam splitter; and
receiving the LO signal by the one or more PDs directly.

20. The method of claim 14, further comprising scanning, by one or more scanners, the target to generate the target return signal.

* * * * *